United States Patent
Britton

(10) Patent No.: US 6,664,915 B1
(45) Date of Patent: Dec. 16, 2003

(54) IDENTIFICATION FRIEND OR FOE SYSTEM INCLUDING SHORT RANGE UV SHIELD

(75) Inventor: Daniel A. Britton, Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/173,526

(22) Filed: Jun. 10, 2002

(51) Int. Cl.[7] .............................................. G01S 13/78
(52) U.S. Cl. ............................ 342/45; 342/42; 342/52; 342/68; 342/195; 398/106; 398/108; 398/168; 102/211; 102/213
(58) Field of Search ............................. 342/42–58, 61, 342/68, 175, 195, 67; 102/200, 206, 211–219; 359/152, 153, 350, 352, 359, 360, 361, 515, 520–553; 385/15; 372/5, 9–32, 38.1; 398/104–108, 121, 125, 151, 168, 169, 170, 182–201, 126, 128–131; 380/270, 287

(56) References Cited

U.S. PATENT DOCUMENTS

| | | | | | |
|---|---|---|---|---|---|
| 3,400,393 | A | * | 9/1968 | Ash .............................. | 342/61 |
| 3,900,867 | A | * | 8/1975 | Wagner ........................ | 342/45 |
| 3,989,942 | A | * | 11/1976 | Waddoups ................... | 398/170 |
| 4,249,265 | A | * | 2/1981 | Coester ....................... | 398/170 |
| 4,763,361 | A | * | 8/1988 | Honeycutt et al. ........... | 398/108 |
| 5,001,488 | A | * | 3/1991 | Joguet ......................... | 342/45 |
| 5,130,713 | A | * | 7/1992 | Wagner ........................ | 342/45 |
| 5,142,288 | A | * | 8/1992 | Cleveland .................... | 342/45 |
| 5,170,168 | A | * | 12/1992 | Roth ............................ | 342/45 |
| 5,299,227 | A | * | 3/1994 | Rose ............................ | 342/45 |
| 5,317,442 | A | * | 5/1994 | Sharp et al. ................. | 398/170 |
| 5,434,668 | A | * | 7/1995 | Wootton et al. ............. | 398/170 |
| 5,459,470 | A | * | 10/1995 | Wootton et al. ............. | 342/45 |
| 5,485,301 | A | * | 1/1996 | Miller .......................... | 398/129 |
| 5,686,722 | A | * | 11/1997 | Dubois et al. ............... | 342/45 |
| 5,745,575 | A | * | 4/1998 | Otto et al. ................... | 380/270 |
| 5,796,362 | A | * | 8/1998 | Ayasli et al. ................. | 342/45 |
| 5,966,227 | A | * | 10/1999 | Dubois et al. ............... | 398/169 |
| 6,466,710 | B1 | * | 10/2002 | Pergande .................... | 385/15 |

FOREIGN PATENT DOCUMENTS

FR 2500933 A * 9/1982 ........... G01S/17/74

* cited by examiner

Primary Examiner—Bernarr E. Gregory
(74) Attorney, Agent, or Firm—Donald E. Lincoln

(57) ABSTRACT

An identification friend or foe system for use by a weapon to determine whether a target that has been selected is a friendly target comprises a signal source attached to the target and arranged to radiate encrypted signals. A detection system attached to the weapon includes a receiver arranged to receive the encrypted signals when the weapon is within a predetermined range from the target. Signal processing apparatus is connected to the receiver and arranged to determine whether the encrypted signals identify the target as being friendly. The central processing unit is arranged to decrypt the encrypted signal and produce a disarm signal if the target is identified as being friendly. The central processing unit preferably is also arranged to produce a signal that causes the weapon to perform a collision avoidance maneuver to avoid colliding with the target if the target is identified as being friendly.

15 Claims, 2 Drawing Sheets

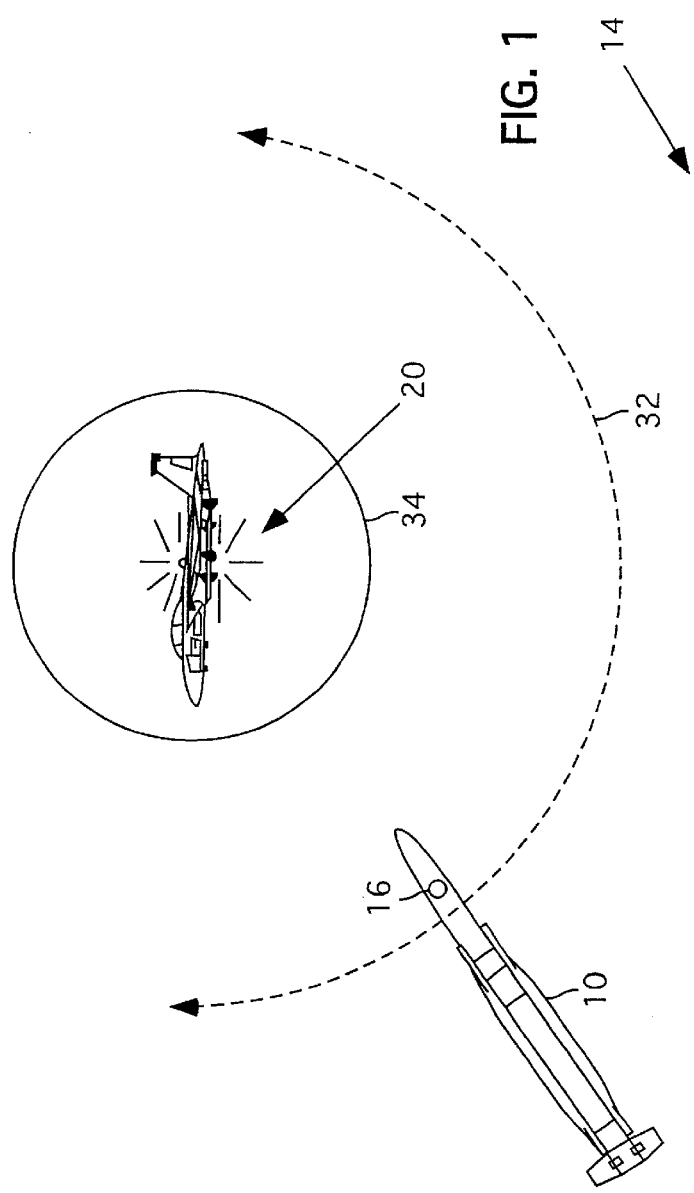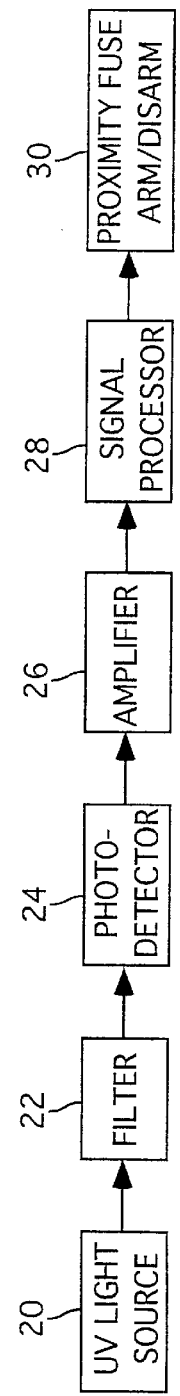

IDENTIFICATION FRIEND OR FOE SYSTEM INCLUDING SHORT RANGE UV SHIELD

BACKGROUND OF THE INVENTION

1. Field of the Invention.

This invention relates generally to an identification friend or foe (IFF) system and particularly to an IFF system that may be used by a launched weapon to distinguish friend from foe and divert to avoid damaging or destroying friendly targets. Still more particularly, this invention is directed to a passive system in which friendly targets are equipped with light sources that emit encrypted ultraviolet (UV) signals that may be detected by a missile or torpedo.

2. Description of the Prior Art.

Current technology for distinguishing friend from foe places the decision on the weapons launcher prior to launch of a missile, torpedo or other ordnance. Prior IFF systems use radio frequencies that are exploitable over long distances because they are designed to transfer information over long distances. A problem with prior IFF systems is that once launched, a weapon is unable to recognize a target as friendly and divert. This problem arises because weapon ranges exceed the ranges at which IFF is possible and because weapons such as torpedoes are designed to find targets but not to discriminate between friend and foe.

SUMMARY OF THE INVENTION

An object of the invention is to provide a system that disarms a weapon after a selected target is identified as being friendly.

Still another object of the invention is to provide a system that causes a weapon to make a collision avoidance maneuver after identifying a selected target as being friendly.

Accordingly an identification friend or foe system according to the invention for use by a weapon to determine whether a target that has been selected is a friendly target comprises a signal source attached to the target and arranged to radiate encrypted signals. A detection system attached to the weapon includes a receiver arranged to receive the encrypted signals when the weapon is within a predetermined range from the target. Signal processing apparatus is connected to the receiver and arranged to determine whether the encrypted signals identify the target as being friendly.

The identification friend or foe system of claim 1 wherein the receiver comprises a photodetector that produces electrical signals in response to encrypted signals incident thereon and wherein the signal processing apparatus includes an amplifier connected to the photodetector and a central processing unit connected to the amplifier. The central processing unit is arranged to decrypt the encrypted signal and produce a disarm signal if the target is identified as being friendly.

The central processing unit preferably is also arranged to produce a signal that causes the weapon to perform a collision avoidance maneuver to avoid colliding with the target if the target is identified as being friendly.

The signal source preferably produces encrypted signals in the ultraviolet region of the electromagnetic spectrum.

The encrypted signals preferably have a wavelength that is attenuated in the atmosphere such that there is a predetermined maximum range from the target at which the encrypted signals are detectable by the photodetector.

The invention further includes a method for identifying friend or foe system for use by a weapon to determine whether a target that has been selected is a friendly target that comprising the steps of (a) attaching signal sources to friendly targets, (b) arranging the signal sources to radiate encrypted signals that identify the targets as being friendly, (c) attaching a detection system to the weapon, (d) receiving the encrypted signals with the detection system when the weapon is within a predetermined range from a selected target, (e) connecting signal processing apparatus detection system, and (f) arranging the signal processing apparatus to determine whether the encrypted signals identify the target as being friendly.

The method according to the invention preferably further includes the step of arranging the signal processing apparatus to produce a disarm signal that disarms the weapon if the target is identified as being friendly.

The method preferably also includes the step of arranging the signal processing apparatus to produce a signal that causes the weapon to perform a collision avoidance maneuver to avoid colliding with the target if the target is identified as being friendly.

BRIEF DESCRIPTION OF THE DRAWINGS

FIG. 1 shows an aircraft and a missile equipped with components of an ultraviolet IFF system according to the present invention;

FIG. 2 is a block diagram of an IFF system according to the present invention.

DETAILED DESCRIPTION OF THE INVENTION

Figure 3:
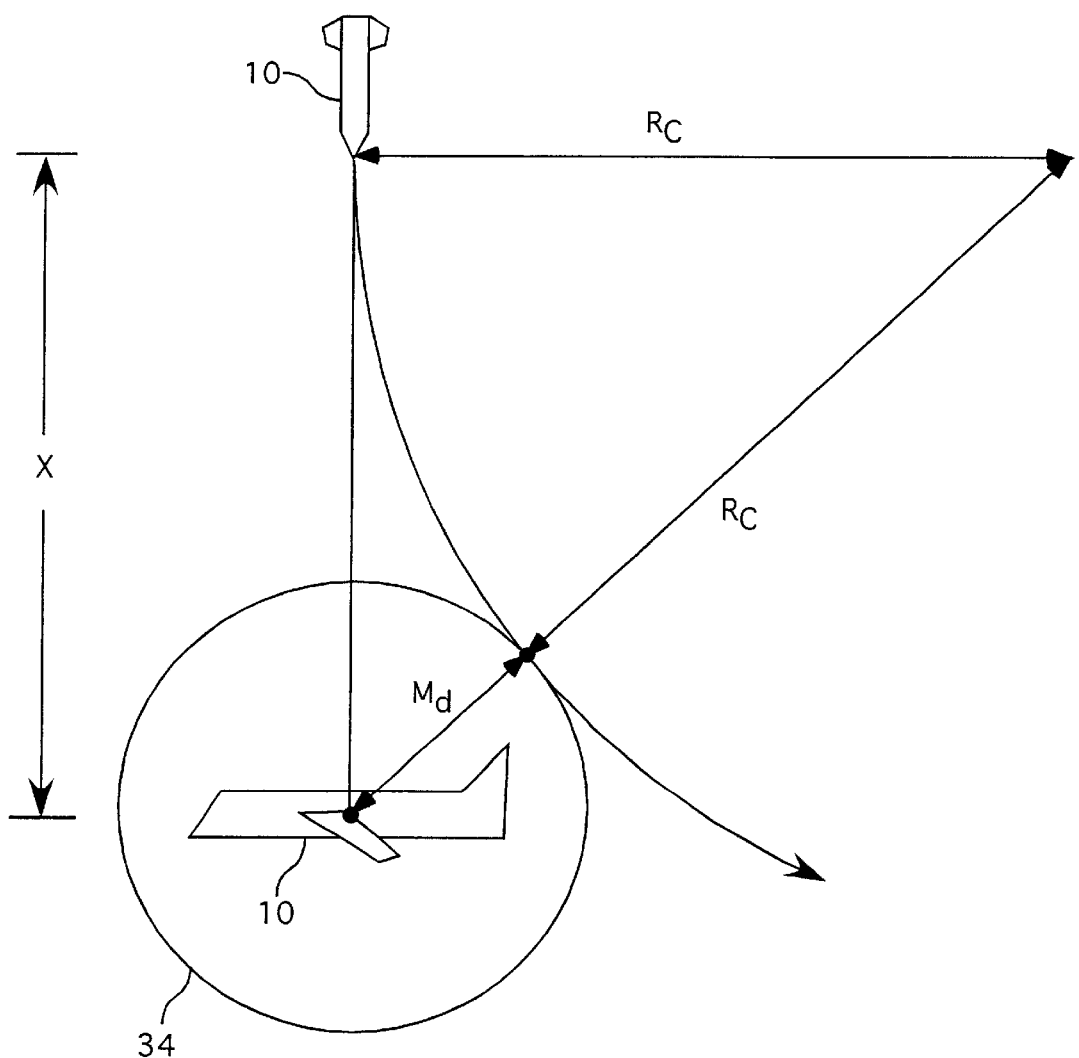
FIG. 3 illustrates a missile avoidance maneuver.

As shown in FIG. 1, the present invention is described with reference to a missile 10 and a target 12, which is typically an aircraft. It should be understood that the invention is not limited in its application only to missiles and aircraft. The principles of the invention are applicable to "smart" weapons, torpedoes and watercraft and land-based targets such as fixed facilities and vehicles.

This invention is directed to an autonomous IFF system 14 that functions while the missile 10 approaches the target 12. Typically the missile 10 includes a proximity fuse (not shown) that detonates ordnance (not shown) carried by the missile when it comes within a predetermined range of the target 12. The present invention is designed to disarm the proximity fuse when the target is identified as friendly. The invention is also designed to make the missile change course to avoid physical contact between the missile 10 and the target 12.

For autonomous IFF system 14 to function, the missile 10 must communicate with the target 12 by active interrogation or via passive means. A passive system is more attractive because it is much lighter and smaller than any known active alternative.

As shown in FIG. 2 the IFF system 14 includes a light source 20, which produces electromagnetic radiation that preferably is in the ultraviolet (UV) region of the spectrum. The light source 20 is mounted on the aircraft 12 and arranged to direct encrypted UV signals substantially uniformly around the aircraft 12 so that it appears to be similar to a point source of radiation. Thus the radiation emitted from the light source 20 is substantially spherically distributed with the aircraft 12 being at the center of the spherical distribution.

A detection system 16 is mounted on the missile 10. The detection system 16 preferably includes a filter 22 that passes wavelengths emitted by the light source 20 and blocks other wavelengths. After passing through the filter 22, the encrypted UV signals impinge upon a photodetector 24 that is arranged to produce electrical signals that correspond to the incident UV signals. The photodetector 24 may be mounted on the surface of the missile 10. Alternatively, the photodetector 24 may be located inside the missile 10, in which case the photodetector 24 receives signals via fiber optics.

The electrical signals output from the photodetector 24 are then amplified by an amplifier 26. The amplified electrical signals are input to a signal processor 28 that is arranged to decrypt the signals input thereto to identify the target 12 as friend or foe.

After identifying the target 12 as friendly, the SIGNAL PROCESSOR 28 sends a disarm signal to a proximity fuse arm/disarm circuit 30 to prevent the ordnance carried by the missile 10 from detonating and damaging or destroying the target 12. Identification of the UV signal also initiates a missile maneuver to avoid skin-to-skin contact between the missile 10 and the target 12.

The light source 20 preferably comprises a plurality of low-pressure mercury vapor lamps (not shown), which emit UV radiation having a wavelength of about 254 nm. The intensity of a spherically spreading wave as a function of range is given by $$I(R) = I_0 \frac{e^{-\mu R}}{R^2}, \quad (1)$$

where $I_0$ is the initial signal intensity, R is the range and $\mu$ is the extinction (attenuation) coefficient. The 254 nm emission has a large extinction coefficient, which results in poor atmospheric transmittance. This poor transmittance characteristic is used in the present invention to provide a limited range at which the target 12 may be identified. In general, extinction coefficients are wavelength dependent. As a result certain wavelengths propagate better than others.

The UV signals are intensity modulated by an encryption scheme. Suitable intensity modulation techniques are well-known in the art. Due to low atmospheric transmission of the 254 nm wavelength, a "UV-bubble" 32 approximately 4000 ft in radius is created around the target 12. At ranges greater than about 4000 ft from the light source 20, the UV signals ordinarily cannot be detected by the photodetector 24. A properly equipped friendly missile 10 detects the 254 nm signal upon entering the "bubble." If the proper encrypted code is detected, the missile 10 will disable proximity detonation and perform an avoidance maneuver.

Closure rate between the missile and aircraft is assumed to be Mach 4. The missile is further assumed to be capable of a 30 g maneuver. A minimum miss distance of 200 ft is desired to permit placement of the light source 20 on the target 12 while still avoiding missile contact with the wing tips of the largest aircraft expected to be encountered. B-52 aircraft have a tip-to-tip wingspan of 180 ft. The turn radius ($R_c$) for a missile maneuvering from steady flight is a function of the acceleration and velocity (V) of the missile. For a 30 g acceleration turn the radius of curvature ($R_c$) is given by $$R_c = \frac{V^2}{30g}, \quad (2)$$

where g is the acceleration of gravity.

FIG. 3 shows the path taken by a missile experiencing a constant acceleration turn. The turn is initiated at the turn away range (x) from the aircraft. This results in a miss distance ($M_d$).

Assuming a missile velocity of Mach 4 at sea level (4466 ft/sec) and a 30 g acceleration, missing the light source 20 by 200 feet requires the missile to initiate a turn 2000 feet from the light source 20

The initiation of missile fin movement and disabling of proximity fuse detonation can occur only after valid identification of the light bulb by the missile. For purposes of discussion it is assumed that the encryption consists of a 32-bit string modulated at 5 Khz. It is further assumed that decryption requires valid reception of 30 strings (1000 bits). The time it takes for 1000 bits to be transmitted is $$\frac{1000 \text{ bits}}{5000 \frac{\text{bits}}{\text{sec}}} = 0.20 \text{ sec.} \quad (3)$$

Based on the intensity of UV radiation emitted from typical mercury vapor lamps, it is assumed that initial detection occurs at a range of 4000 ft. During the time 30 repetitions of the 32-bit string are received, the missile 10 will travel $$\frac{4466 \text{ ft}}{\text{sec}} \cdot (0.20 \text{ sec}) = 893 \text{ ft} \quad (4)$$

closer to the target 12. As a result, the missile 10 has a valid detection of a friendly target 12 at a range of approximately 3100 ft, which is more than adequate to successfully perform an avoidance maneuver.

It should be noted that there are time delays associated with the photodetector 24 that must also be considered. It takes a finite amount of time for the photodetector 24 to output an electrical signal that corresponds to an optical signal input. For a typical commercially available photodetector having a 12 ns rise time and 60 ns electron transit time, it may take up to 2.3 ms for all 32 bits of a string to be received by the detector. The missile 10 travels 10 ft in 2.3 ms and an additional 300 ft by the time the bit string has been repeated 30 times. This places the missile 10 at a distance of 2800 ft from the target 12 by the time the photodetector 24 has actually produced an electrical signal corresponding to the 30 repetitions of the 32-bit string. The conclusion is that there is adequate time for the missile to maneuver still holds. Initial detection at a range of 4000 ft corresponds to 0.88 sec before impact for a Mach 4 (4466 ft/sec) missile at sea level. The 32-bit encryption string is decrypted by the missile at a range of 2800 ft. Starting a 30 g missile maneuver when the missile 10 is 2000 ft from the target 12 results in a miss distance of 200 ft.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. An identification friend or foe system for use by a weapon to determine whether a target that has been selected is a friendly target comprising:

a signal source attached to the target and arranged to radiate encrypted signals;

a detection system attached to the weapon, the detection system including:
  a receiver arranged to receive the encrypted signals when the weapon is within a predetermined range from the target, wherein the receiver comprises a photodetector that produces electrical signals in response to encrypted signals incident thereon; and
  signal processing apparatus connected to the receiver and arranged to determine whether the encrypted signals identify the target as being friendly wherein the signal processing apparatus includes an amplifier connected to the photodetector and a central processing unit connected to the amplifier.

2. The identification friend or foe system of claim 1, wherein the central processing unit is arranged to decrypt the encrypted signal and produce a disarm signal if the target is identified as being friendly.

3. The identification friend or foe system of claim 2, wherein the central processing unit is arranged to produce a signal that causes the weapon to perform a collision avoidance maneuver to avoid colliding with the target if the target is identified as being friendly.

4. An identification friend or foe system for use by a weapon to determine whether a target that has been selected is a friendly target comprising:
  a detection system attached to the weapon and arranged to interrogate the target to determine whether the target is emitting a signal having a predetermined wavelength, the detection system including:
    a receiver arranged to receive the signals when the weapon is within a predetermined range from the target, wherein the receiver comprises a photodetector that produces electrical signals in response to encrypted signals incident thereon; and
    signal processing apparatus connected to the receiver and arranged to determine whether the signals identify the target as being friendly, wherein the signal processing apparatus includes an amplifier connected to the photodetector and a central processing unit connected to the amplifier.

5. The identification friend or foe system of claim 4, wherein the central processing unit is arranged to produce a disarm signal if the target is identified as being friendly, further including an arm/disarm device connected to the central processing unit and arranged to disarm the weapon upon receiving the disarm signal therefrom.

6. The identification friend or foe system of claim 5, wherein the central processing unit is arranged to produce a signal that causes the weapon to perform a collision avoidance maneuver to avoid colliding with the target if the target is identified as being friendly.

7. A method for identifying friend or foe system for use by a weapon to determine whether a target that has been selected is a friendly target, comprising the steps of:
  attaching signal sources to friendly targets;
  arranging the signal sources to radiate encrypted signals that identify the targets as being friendly;
  attaching a detection system to the weapon;
  receiving the encrypted signals with the detection system when the weapon is within a predetermined range from a selected target;
  connecting signal processing apparatus detection system; and
  arranging the signal processing apparatus to determine whether the encrypted signals identify the target as being friendly.

8. The method of claim 7, including the step of arranging the signal processing apparatus to produce a disarm signal that disarms the weapon if the target is identified as being friendly.

9. The method of claim 8, including the step of arranging the signal processing apparatus to decrypt the encrypted signal and produce the disarm signal if the target is identified as being friendly.

10. The method of claim 9, including the step of arranging the signal processing apparatus to produce a signal that causes the weapon to perform a collision avoidance maneuver to avoid colliding with the target if the target is identified as being friendly.

11. The method of claim 7, including the step of arranging the signal source to produce encrypted signals in the ultraviolet region of the electromagnetic spectrum.

12. A method for identifying friend or foe system for use by a guided weapon to determine whether a target that has been selected is a friendly target, comprising the steps of:
  attaching a detection system to the weapon;
  arranging the detection system to interrogate the target to determine whether the target is emitting signals having a predetermined wavelength when the weapon is within a predetermined range from the target; and
  connecting signal processing apparatus to the detection system; and
  arranging the signal processing apparatus to determine whether the signals identify the target as being friendly.

13. The method of claim 12, further comprising the step of arranging the signal processing apparatus to produce a disarm signal that disarms the weapon if the target is identified as being friendly.

14. The method of claim 13, including the step of arranging the signal processing apparatus to produce a signal that causes the weapon to perform a collision avoidance maneuver to avoid colliding with the target if the target is identified as being friendly.

15. The method of claim 12, including the step of arranging the signal processing apparatus to produce a signal that causes the weapon to perform a collision avoidance maneuver to avoid colliding with the target if the target is identified as being friendly.

* * * * *